United States Patent [19]

Suzuki

[11] Patent Number: 5,926,663
[45] Date of Patent: Jul. 20, 1999

[54] ROTATION DRIVING DEVICE AND OPTICAL APPARATUS HAVING THE SAME

[75] Inventor: Ryuji Suzuki, Yokohama, Japan

[73] Assignee: Canon Kabushiki Kaisha, Tokyo, Japan

[21] Appl. No.: 08/884,337

[22] Filed: Jun. 27, 1997

[30] Foreign Application Priority Data

Jul. 2, 1996 [JP] Japan .................................. 8-189950

[51] Int. Cl.⁶ .................................................. G03B 17/24
[52] U.S. Cl. .......................... 396/449; 396/451; 396/463; 396/497; 396/510
[58] Field of Search ..................................... 396/439, 449, 396/451, 452, 463, 493, 497, 505, 508, 510

[56] References Cited

U.S. PATENT DOCUMENTS 5,365,298  11/1994  Fox ........................................ 396/463
5,418,588   5/1995  Chigira .................................. 396/463

*Primary Examiner*—David M. Gray
*Attorney, Agent, or Firm*—Robin, Blecker & Daley

[57] ABSTRACT

A rotation driving device comprises a first fixed member having an aperture, a second fixed member having an aperture, the second fixed member being fixed with respect to the first fixed member, a ring-like rotary member, the rotary member being fitted in the first fixed member at an outer diameter portion of the rotary member and being fitted in the second fixed member at a diameter portion of the rotary member having a diameter smaller than that of the outer diameter portion, and a moving member arranged to advance and retreat in a radial direction of the rotary member in accordance with a rotation of the rotary member, wherein, where an amount of fitting play between the second fixed member and the rotary member is denoted by X and an amount of fitting play between the first fixed member and the rotary member is denoted by Y, the rotation driving device satisfies the following condition:

$X < Y$.

10 Claims, 6 Drawing Sheets

ROTATION DRIVING DEVICE AND OPTICAL APPARATUS HAVING THE SAME

BACKGROUND OF THE INVENTION

1. Field of the Invention

The present invention relates to a rotation driving device, and more particularly to a rotation driving device suitable for use in a diaphragm device of an optical apparatus, such as a camera, which employs a stepping motor as a drive source.

2. Description of Related Art

In a conventional rotation driving device using a stepping motor, for example, in a diaphragm device used in an optical apparatus or the like, a ring-like rotary member (rotary ring) and diaphragm blades are interposed between two ring-like fixed members (first and second fixed members), thereby constituting a diaphragm unit. Dowels provided on the diaphragm blades are fitted into and engaged with a plurality of cams formed in the first fixed member (cam plate) and holes bored in the rotary ring, respectively. Further, the drive of the diaphragm blades are effected by the sliding movements of the dowels along the cams according to the rotation of the rotary ring, so that the diaphragm blades are driven to cover aperture holes formed in the first fixed member and the rotary ring and open the aperture holes up to a set aperture value.

In such an arrangement, the rotational fitting of the rotary ring and the first fixed member is required to be made at the outer circumference of the rotary ring. This is because the diaphragm blades are placed in between the rotary ring and the first fixed member and are arranged to pass on the inner circumferential side of the rotary ring when being driven and, hence, it is impossible that the rotational fitting of the rotary ring and the first fixed member is made on the inner circumferential side of the rotary ring.

Meanwhile, in the case of the above-mentioned conventional example, since the rotary ring is so configured as to be rotationally fitted in the first fixed member at the outer circumference of the rotary ring, it is said that the rotational fitting is made at a larger outer diameter portion, thereby creating a problem in that the rotational load torque to the rotary ring would become large. In other words, the rotational fitting at the larger outer diameter portion brings about a larger rotational load torque to the rotary ring, even if a frictional force at the fitting portion is small.

On the other hand, while it is conceivable to employ an electromagnetic motor, such as a stepping motor, as a drive source for the rotary ring, in the case of using the stepping motor, the large rotational load torque as mentioned above causes a disadvantage in that the deterioration of the rotational performance and rotational efficiency would take place and, in the worst situation, the loss of synchronism is brought about to stop the stepping motor.

In addition, in the field of cameras or the like, the recent trend is toward making it compact, and, therefore, the size reduction of the stepping motor itself has been in demand. Since the size reduction of the stepping motor naturally leads the motor itself to lowering its power, the deterioration of the aforesaid rotational performance, i.e., the rotational efficiency, becomes remarkable, and, further, the loss of synchronism tends to more easily take place.

One possible solution of this problem is that, instead of the rotational fitting of the rotary ring and the first fixed member, the rotational fitting of the rotary ring is made with the second fixed member (ring-like base plate), which finally covers the diaphragm blades and the rotary ring to put them therein in a state where the diaphragm blades and the rotary ring are incorporated onto the first fixed member. In this arrangement, the rotational fitting at a small diameter portion can be attained. The reason is that the diaphragm blades are absent between the rotary ring and the second fixed member (ring-like base plate) in their thrust directions and, hence, the diameter for the rotational fitting can be defined at a closest portion to the inner diameter of the aperture hole through which a photographing light beam passes.

According to this structure, there is no fitting between the rotary ring and the first fixed member at the large outer diameter portion. Therefore, the increase in the rotational load torque can be prevented by the rotational fitting at the small diameter portion.

However, in the case of the above solution method, considering the assembling procedure for the fitting between the rotary ring and the ring-like base plate, the incorporation of the diaphragm blades is first made in such a manner that one dowel of each of the diaphragm blades is fitted in the cam formed on the first fixed member and, subsequently, the incorporation of the rotary ring is made in such a manner that the other dowel of each of the diaphragm blades is fitted in the hole portion of the rotary ring, and, finally, the ring-like base plate is positioned and fixed.

In the above assembling procedure, the rotary ring with the diaphragm blades set on the first fixed member is required to be fitted in the ring-like base plate under the condition that there is no fitting between the rotary ring and the first fixed member, i.e., under the condition that no centering of the rotary ring takes place (or after the centering of the rotary ring is taken). Therefore, the ring-like base plate needs to be fitted on the rotary ring while being positioned and supported with respect to the first fixed member, so that the assembling efficiency is very much lowered, taking a long assembling time and bringing up the manufacturing cost.

BRIEF SUMMARY OF THE INVENTION

It is an object of the present invention to provide a rotation driving device which has a structure to accomplish a small rotational load torque of a rotary ring and which is capable of providing an extremely high assembling efficiency.

To attain the above object, in accordance with an aspect of the present invention, there is provided a rotation driving device, which comprises a first fixed member having an aperture, a second fixed member having an aperture, the second fixed member being fixed with respect to the first fixed member, a ring-like rotary member, the rotary member being fitted in the first fixed member at an outer diameter portion of the rotary member and being fitted in the second fixed member at a diameter portion of the rotary member having a diameter smaller than that of the outer diameter portion, and a moving member arranged to advance and retreat in a radial direction of the rotary member in accordance with a rotation of the rotary member, wherein, where an amount of fitting play between the second fixed member and the rotary member is denoted by X and an amount of fitting play between the first fixed member and the rotary member is denoted by Y, the rotation driving device satisfies the following condition:

X<Y.

DETAILED DESCRIPTION OF THE INVENTION

Preferred embodiments of the present invention will be described below in detail with reference to the drawings.

Figure 1:
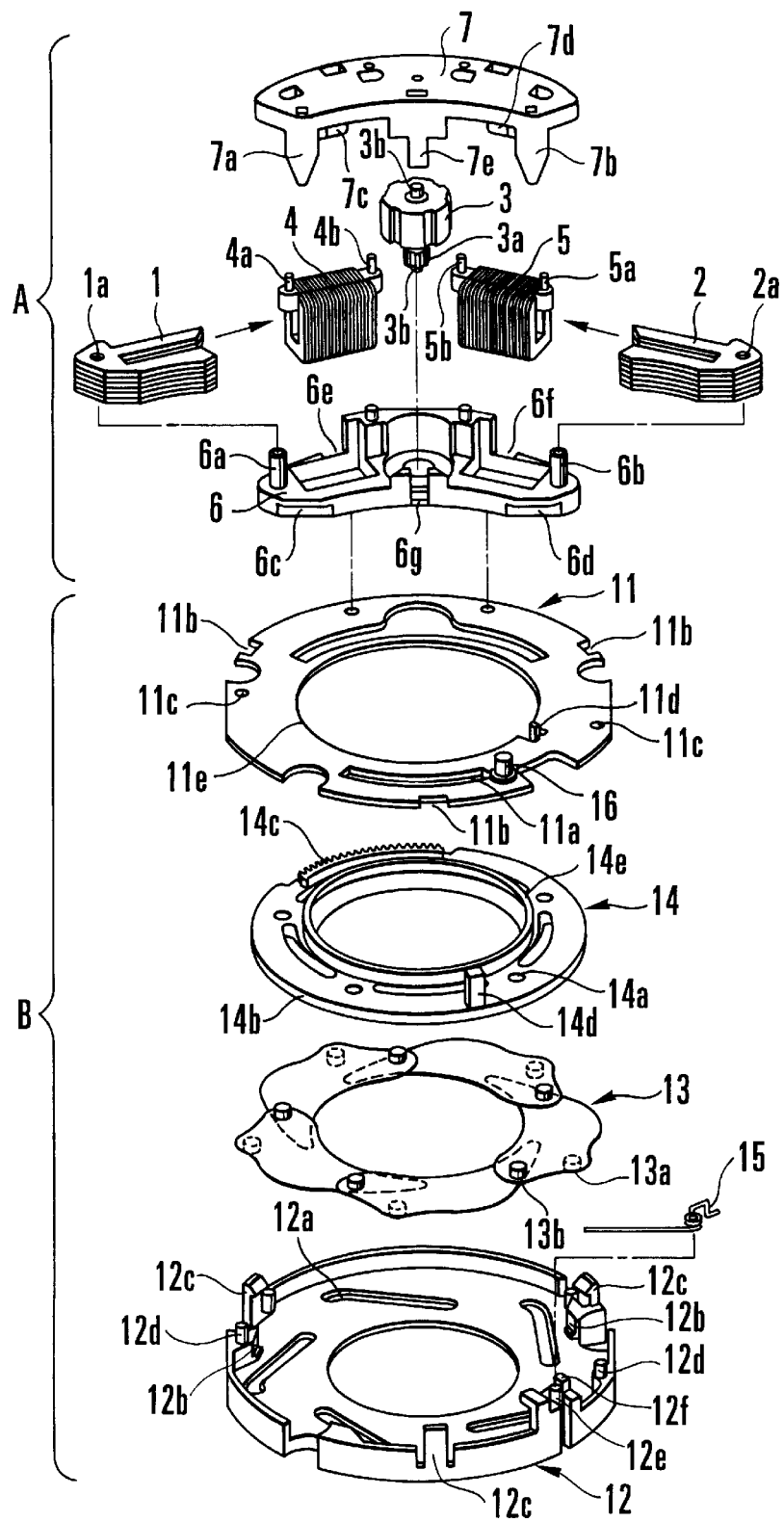
FIG. 1 is an exploded perspective view showing a diaphragm device of an optical apparatus corresponding to a rotation driving device according to a first embodiment of the present invention.
Figure 2:
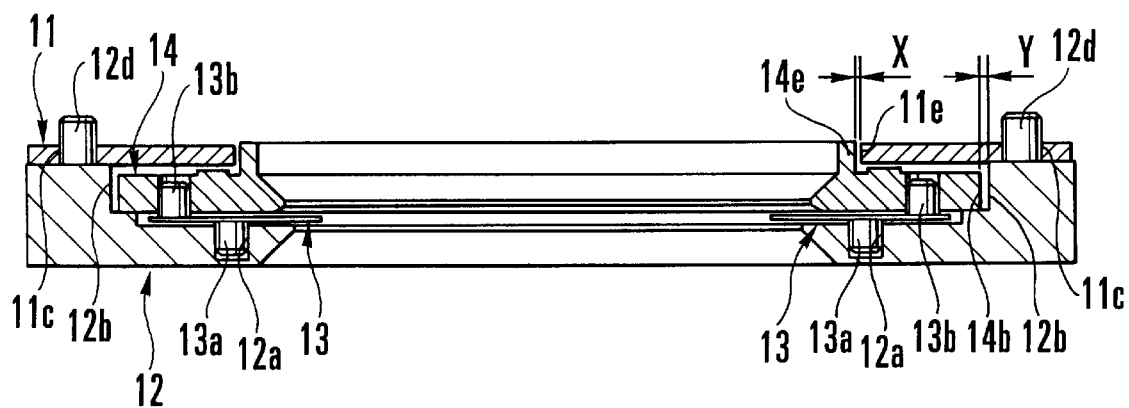
FIG. 2 is a cross-sectional view showing the diaphragm device shown in FIG. 1.
Figure 3:
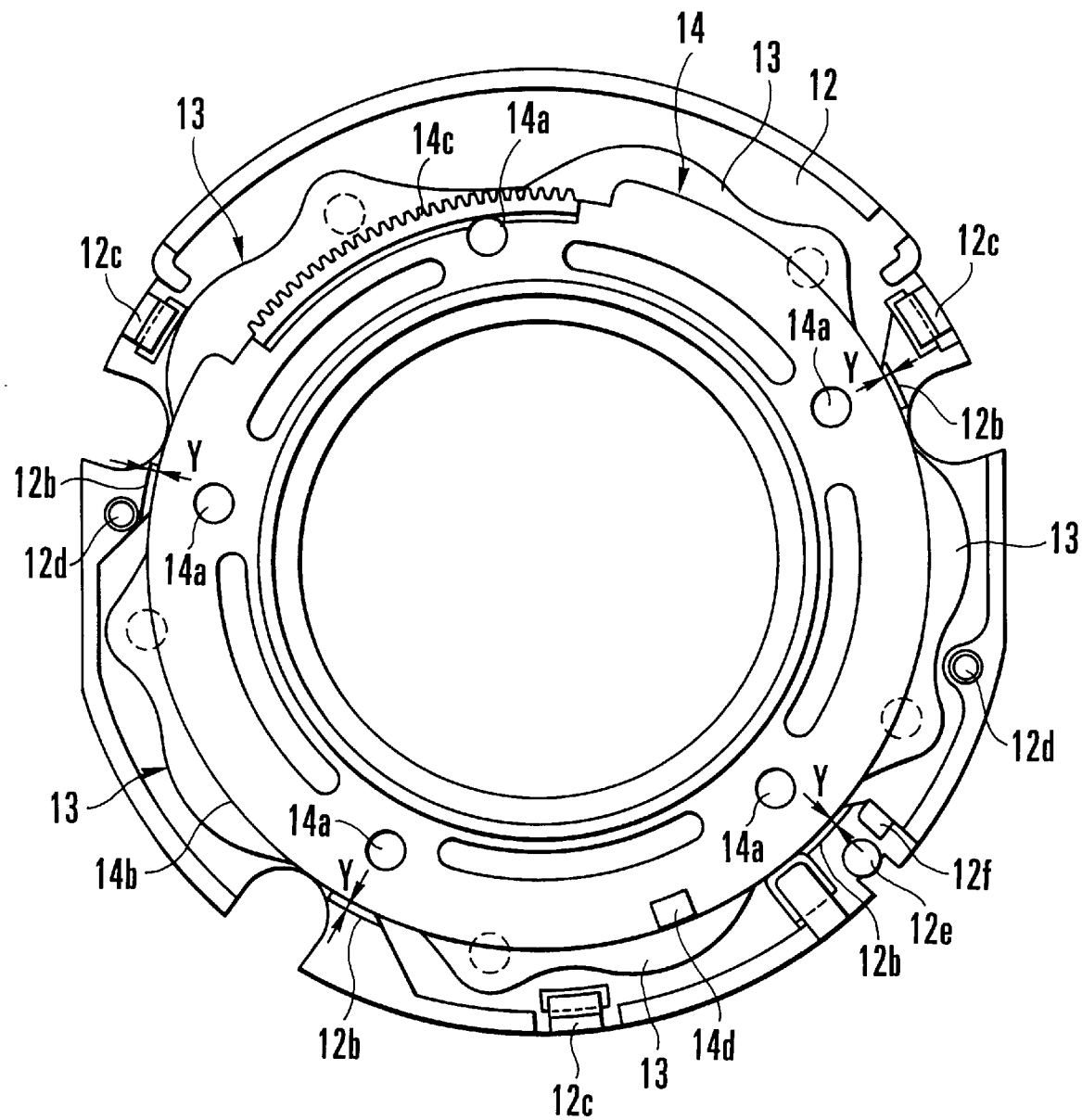
FIG. 3 is a plan view showing the diaphragm device shown in FIG. 1.

FIG. 1 is an exploded perspective view showing a diaphragm device of an optical apparatus corresponding to a rotation driving device according to a first embodiment of the present invention, FIG. 2 is a cross-sectional view showing the diaphragm device shown in FIG. 1, and FIG. 3 is a plan view showing the diaphragm device shown in FIG. 1.

Referring FIGS. 1 to 3, reference numerals 1 and 2 denote stator yokes made by piling up a plurality of (in this embodiment, 6) soft-magnetic plates having the same configuration and by fixedly securing them to each other, with the stator yokes 1 and 2 organizing stator yokes of a two-phase type stepping motor, respectively. Further, the stator yoke 2 is in the form obtained by turning over the stator yoke 1. Reference numeral 3 denotes a plastic-magnet-made rotor which is rotatable when the stator yokes 1 and 2 come into an excited condition, with the rotor 3 being integrally equipped with a gear section 3a for transferring its rotational force to a rotary ring 14 which will be mentioned later. Reference numerals 4 and 5 denote coils for exciting the stator yokes 1 and 2, respectively, which are constructed with the same parts. The coils 4 and 5 are made to excite the stator yokes 1 and 2 when being energized through terminals 4a and 4b and terminals 5a and 5b, respectively.

Further, reference numeral 6 denotes a motor case for positioning and supporting the stator yokes 1 and 2 through the use of hole portions 1a and 2a and shafts 6a and 6b, respectively, and further for supporting a rotating shaft 3b of the rotor 3 to allow its rotation. That is, since the stator yokes 1 and 2 and the rotor 3 are positioned in the motor case 6 and defined in the dimensional tolerance relation to only the motor case 6, it is possible to keep on minimizing the difference of the gap between the stator yokes 1 and 2 and the rotor 3, which exerts extreme exerts influence on the motor performance, so that the stepping motor is able to have a high-accuracy structure. Reference numeral 7 denotes a motor case cover, which rotatably supports the rotating shaft 3b of the rotor 3, and its claw portions 7a to 7e are hooked on groove portions 6c to 6g of the motor case 6, thereby forming a stepping motor A as a unit.

The above description relates to a construction of the stepping motor A, and a diaphragm device B serving as a rotation driving device is mounted on the stepping motor A.

Next, the structure of the diaphragm device B will be described.

Reference numeral 11 denotes a conductive, ring-like base plate having an aperture hole portion lie at its central portion, which allows the photographing light beam to pass. The above-described stepping motor A is fixed to the ring-like base plate 11 in a well-known way. Reference numeral 12 denotes a ring-like cam plate made of an insulating material. The cam plate 12 has a plurality of well-known diaphragm cams 12a made therein. Reference numeral 13 denotes a plurality of diaphragm blades. Dowels 13a protrusively planted on the rear surfaces of the diaphragm blades 13 are fitted in the diaphragm cams 12a of the cam plate 12. Reference numeral 14 denotes a rotary ring, which is rotatable about the optical axis and has an aperture at its central portion which allows the photographing light beam to pass. Dowels 13b protruded from the front surfaces of the respective diaphragm blades 13 are fitted in a plurality of holes 14a formed in the rotary ring 14. Further, an outer circumferential surface 14b of the rotary ring 14 is fitted on inner circumferential surfaces 12b of four separation projecting portions formed on the cam plate 12, so that the rotary ring 14 is rotatably supported on the cam plate 12. Moreover, the rotary ring 14 is provided with a gear section 14c, which is made to engage with the gear section 3a of the magnet rotor 3 within the stepping motor A.

Further, the rotary ring 14 has a projecting portion 14d at its outer circumferential edge portion and further has a projecting portion 14e at its inner circumferential edge portion. The projecting portion 14d is inserted into an elongated hole 11a formed in the ring-like base plate 11 to be relatively slidable with respect thereto. On the other hand, the cam plate 12 has three hooking portions 12c and positioning pins 12d on its outer circumferential side. The hooking portions 12c are engaged with three notch portions 11b formed in the ring-like base plate 11, and the positioning pins 12d are fitted in hole portions 11c formed in the ring-like base plate 11, so that the rotary ring 14 is put between the ring-like base plate 11 and the cam plate 12. Accordingly, the ring-like base plate 11, the cam plate 12, the diaphragm blades 13 and the rotary ring 14 are integrated as a unit, thus constituting the diaphragm device B.

The diaphragm device B is equipped with a switch to detect whether or not the diaphragm aperture is in a full open condition. Reference numeral 15 denotes a spring made of a conductive material and serving as a component of the switch. The spring 15 is inserted into a switching fitting section 12e provided integrally with a projecting portion 12f of the cam plate 12, and one end portion of the spring 15 is fixedly engaged with the projecting portion 12f of the cam plate 12 while its other end portion is engageable with a switch pin 16. The switch pin 16 is similarly made of a conductive material and caulked on the ring-like base plate 11 to establish electrical communication with the ring-like base plate 11 at all times. More specifically, the ring-like base plate 11 itself electrically acts as the ground, and the electric signal due to the engagement between the spring 15 and an extending bent portion 11d formed at its inner circumferential edge portion is made to be detectable through the contact and non-contact between the spring 15 and the switch pin 16, thereby constituting the above switch. In terms of the contact and non-contact in the switch, when the diaphragm aperture is fully opened, the projecting portion 14d abuts on one end portion of the spring 15 so that the contact between the spring 15 and the switch pin 16 is broken to allow the switch to come into an off-state.

In the above-described construction, a detailed description will be made below of the rotational fitting among the ring-like base plate 11, the cam plate 12 and the rotary ring 14.

First, in the assembling procedure, the plurality of diaphragm blades 13 are incorporated into the cam plate 12 such that the dowels 13a provided on the rear surfaces of the diaphragm blades 13 are fitted in the diaphragm cams 12a of the cam plate 12. Subsequently, the rotary ring 14 is incorporated such that the dowels 13b provided on the front surfaces of the diaphragm blades 13 are fitted in the hole portions 14a of the rotary ring 14. At this time, the fitting between the cam plate 12 and the rotary ring 14 is, as described before, made between the inner circumferential surfaces 12b of the four separation projecting portions formed on the cam plate 12 and the outer circumferential surface 14b of the rotary ring 14, and the fitting play is set to a dimension Y. FIG. 3 is a plan view showing this state.

Following this, the ring-like base plate 11 is incorporated into the cam plate 12 such that the diaphragm blades 13 and the rotary ring 14 are interposed between the ring-like base plate 11 and the cam plate 12. At this time, the fitting between the ring-like base plate 11 and the rotary ring 14 is set to be made at the projecting portion 14e of the rotary ring 14 and the aperture hole portion 11e of the ring-like base plate 11.

More specifically, in this assembling procedure, the ring-like base plate 11 is incorporated such that the positioning pins 12d (two portions) of the cam plate 12 are fitted in the hole portions 11c (two portions) of the ring-like base plate 11. At this time, the rotary ring 14 and the cam plate 12 are roughly centered in advance with respect to the fitting play Y. Since the rotary ring 14 is previously fitted in the cam plate 12 with the fitting play Y, as compared with the case where no fitting portion exists between the rotary ring 14 and the cam plate 12, the rough centering is easier in structure. Therefore, it becomes possible to easily make the fitting between the projecting portion 14e of the rotary ring 14 and the aperture hole portion 11e of the ring-like base plate 11 while carrying out the fitting between the positioning pins 12d and the hole portions 11c. As a result, the notch portions 11b of the ring-like base plate 11 come into engagement with the hooking portions 12c of the cam plate 12, thus completing the diaphragm device B as a unit, as shown in FIG. 2.

After the completion of the unit of the diaphragm device B, since a fitting play X between the aperture hole portion 11e of the ring-like base plate 11 and the projecting portion 14e of the rotary ring 14 is set to be smaller than the above-mentioned fitting play Y between the cam plate 12 and the rotary ring 14, the fitting is made only between the ring-like base plate 11 and the rotary ring 14.

As compared with the prior type where the fitting between the cam plate 12 and the rotary ring 14 is maintained even after the completion of the unit of the diaphragm device B, since, in the diaphragm device according to this embodiment, the fitting is made between the ring-like base plate 11 and the rotary ring 14 at the time of the completion of the unit of the diaphragm device B, in terms of the fitting diameter the fitting between the ring-like base plate 11 and the rotary ring 14 can assume a smaller diameter. (If the fitting between the cam plate 12 and the rotary ring 14 is made at the inner diameter portion, the diaphragm blades interfere, and, hence, there is no choice but to make the fitting with the cam plate 12 at the outer circumferential portion of the rotary ring 14, which naturally increases the fitting diameter.) Therefore, the rotational load torque of the rotary ring 14 becomes smaller. This signifies that an extreme advantage arises in the case of employing as a drive source a stepping motor subject to the loss of synchronism. Particularly, in cases where the stepping motor is required to undergo the size reduction, the expectation of the loss of synchronism due to the low power comes to be low.

Next, referring to FIG. 1, a description will be taken below of an operation of the diaphragm device thus arranged according to this embodiment.

Upon the energization of the coils 4 and 5 through the connection terminals 4a, 4b and 5a, 5b, magnetic fields take place in the stator yokes 1 and 2 interact with a magnetic field of the magnet rotor 3 to set up a closed magnetic circuit. At this time, without the energization to the coil 5, the magnetic circuit occurring by the coil 4 under energization takes a dominating position, so that a rotational torque arises in the magnet rotor 3 (the same occurs even in the case of the energization to only the coil 5). Further, when both the coils 4 and 5 get into the energized condition, in a similar way the magnetic circuits are respectively produced in the stator yokes 1 and 2 and interact with that of the magnet rotor 3, which provides a rotational torque to the magnet rotor 3.

On the other hand, the well-known driving of the stepping motor is performed in such a manner that the energization is made to both the coils 4 and 5 while successively switching the current-flowing directions. The rotation of the stepping motor causes the rotary ring 14 to rotate by a given angle owing to the gearing between the gear section 3a of the magnet rotor 3 and the gear section 14c of the rotary ring 14. Due to the rotation of the rotary ring 14 the dowels 13b provided on the front surfaces of the diaphragm blades 13 are shifted in the rotating direction. Further, the dowels 13a provided on the rear surfaces of the diaphragm blades 13 make the diaphragm blades 13 turn in the opening direction or in the closing direction due to the correlation with the diaphragm cams 12a formed in the cam plate 12, thus conducting the well-known diaphragm opening and closing operation and accomplishing the exposure adjustment.

Figure 4A:
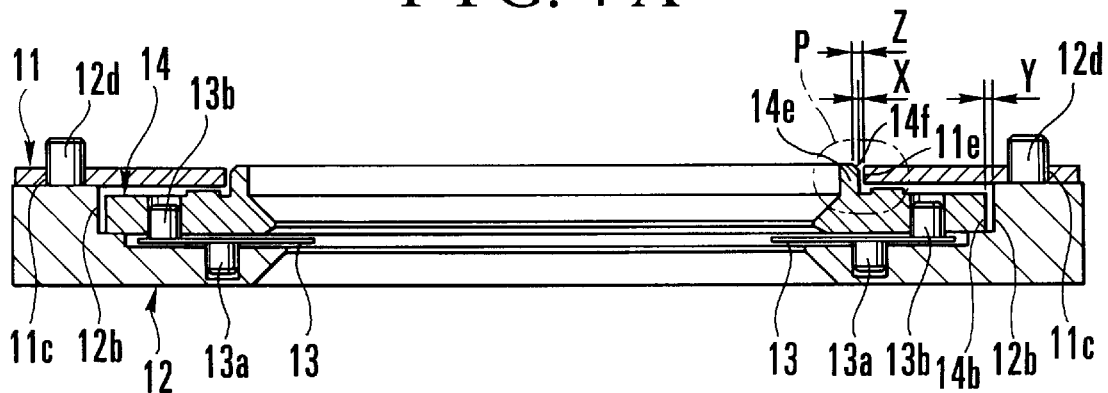
FIGS. 4A and 4B are a cross-sectional view and a partially enlarged view, respectively, showing a diaphragm device according to one example of a second embodiment of the present invention.
Figure 5A:
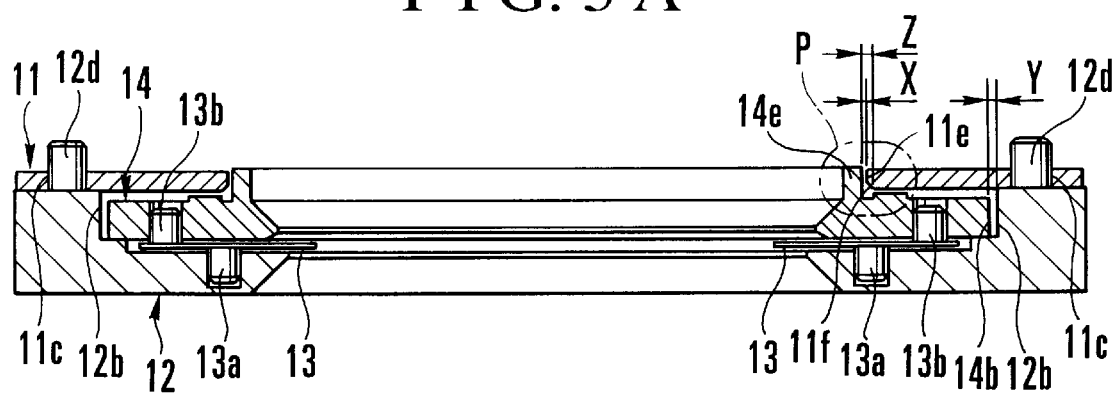
FIGS. 5A and 5B are a cross-sectional view and a partially enlarged view, respectively, showing the diaphragm device according to another example of the second embodiment.
Figure 6A:
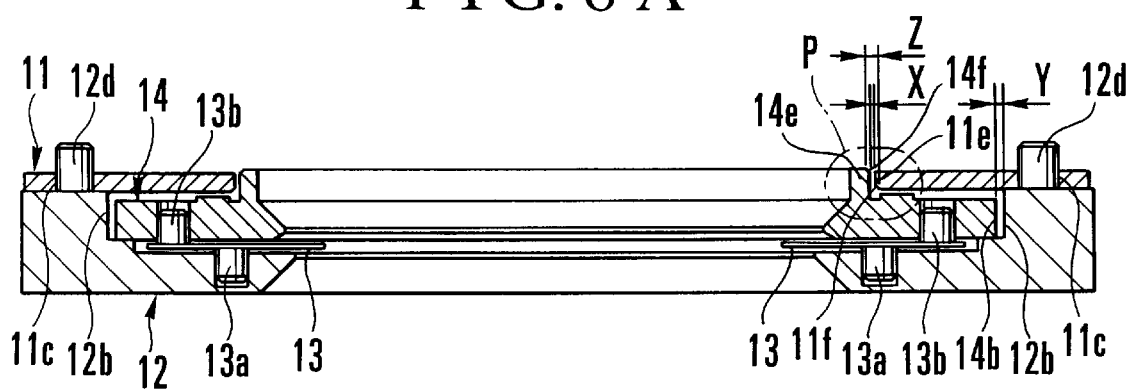
FIGS. 6A and 6B are a cross-sectional view and a partially enlarged view, respectively, showing the diaphragm device according to a further example of the second embodiment.
Figure 4B:
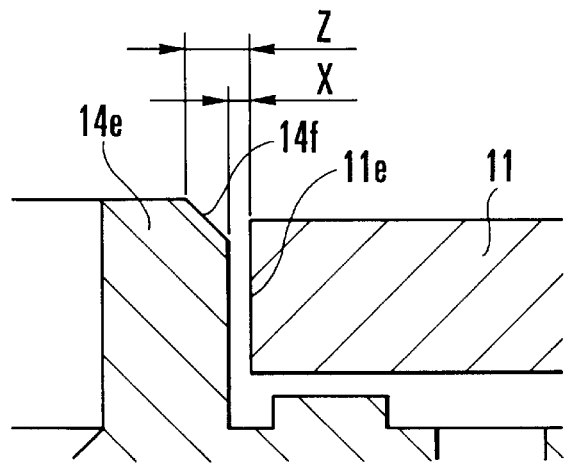
Figure 5B:
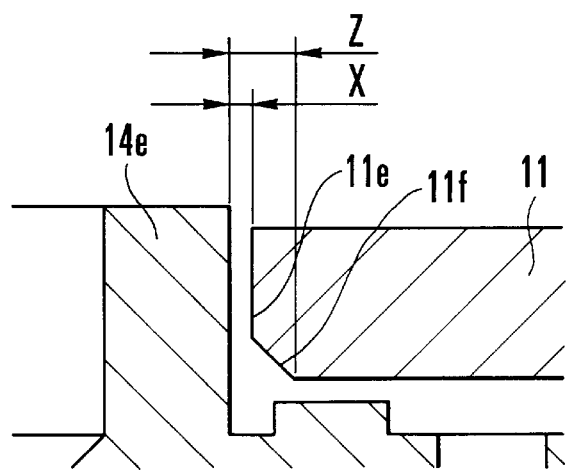
Figure 6B:
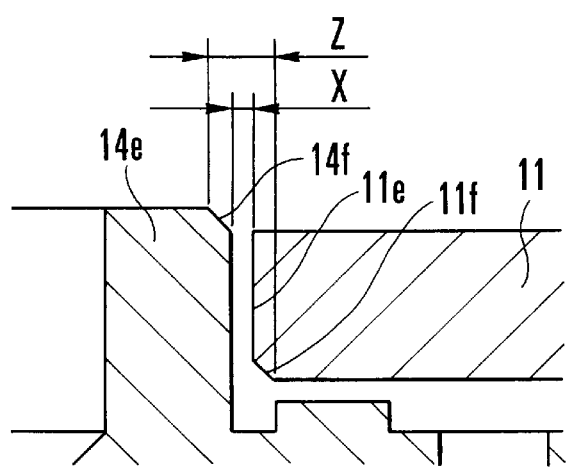

FIGS. 4A and 4B through FIGS. 6A and 6B illustrate three examples of a second embodiment of the present invention. For simplifying the description thereof, the same parts as those in the above-described first embodiment are denoted by the same reference numerals, and the description will be made of only the different portions therefrom. Incidentally, FIGS. 4A, 5A and 6A are cross-sectional views showing the examples of the entire diaphragm device according to the second embodiment, whereas FIGS. 4B, 5B and 6B are enlarged views showing portions indicated by characters P in FIGS. 4A, 5A and 6A.

The second embodiment differs from the above-described first embodiment in the fitting portion between the rotary ring 14 and the ring-like base plate 11.

That is, in the example shown in FIGS. 4A and 4B, the rotary ring 14 has a chamfered portion 14f formed at its outer circumferential surface, and the radial dimension from the starting point of the chamfered portion 14f to the aperture hole portion 11e of the ring-like base plate 11 is set to be Z.

Further, in the example shown in FIGS. 5A and 5B, the aperture hole portion 11e of the ring-like base plate 11 has a chamfered portion 11f, and the radial dimension from the starting point of the chamfered portion 11f to the fitting portion of the projecting portion 14e of the rotary ring 14 is set to be Z.

Still further, in the example shown in FIGS. 6A and 6B, both the ring-like base plate 11 and the rotary ring 14 have chamfered portions 11f and 14f, respectively, and the radial distance between the starting points of the chamfered portions 11f and 14f is set to be Z.

The other structures are the same as those of the foregoing first embodiment.

In the constructions shown in FIGS. 4A and 4B through FIGS. 6A and 6B, the dimensional relation among X, Y and Z is taken to be "X<Y<Z".

With the above relationship, unlike the foregoing first embodiment where the rotary ring 14 and the cam plate 12 are roughly centered in advance before incorporating the ring-like base plate 11, even if the rotary ring 14 is incorporated into the cam plate 12 while being biased by the dimension of the rotational fitting play Y, only by positioning and supporting the ring-like base plate 11 with respect to the cam plate 12, the rotary ring 14 is automatically shifted in the radial direction along the chamfered portion 14f and/or 11f, so that the aperture hole portion 11e of the ring-like base plate 11 is made to be fitted on the projecting portion 14e of the rotary ring 14. For this reason, the assembling performance is considerably enhanced. In addition, as in the case of the above-described first embodiment, after the incorporation of the ring-like base plate 11 into the cam plate 12, the fitting play relationship becomes "X<Y", and, therefore, the cam plate 12 and the rotary ring 14 do not come into fitting contact with each other, but the fitting is made only between the ring-like base plate 11 and the rotary ring 14, and the fitting diameter becomes smaller owing to the fitting between the ring-like base plate 11 and the rotary ring 14, so that the rotational load torque naturally decreases. Incidentally, although in the second embodiment the chamfering is made, needless to say even an R-like configuration exhibits the same effects.

In the above-described first and second embodiments of the present invention, the cam plate 12 corresponds to the first fixed member, the rotary ring 14 corresponds to the rotary member, the diaphragm blades 13 correspond to the moving member, and the ring-like base plate 11 correspond to the second fixed member.

While the correspondence between the constituent elements of the present invention and the elements of the above-described embodiments has been described above, the present invention is not limited to the elements of the embodiments and may encompass all modifications and alterations thereof as long as they are capable of accomplishing the functions defined in the claims and the functions provided by the elements of the embodiments.

Figure 7:
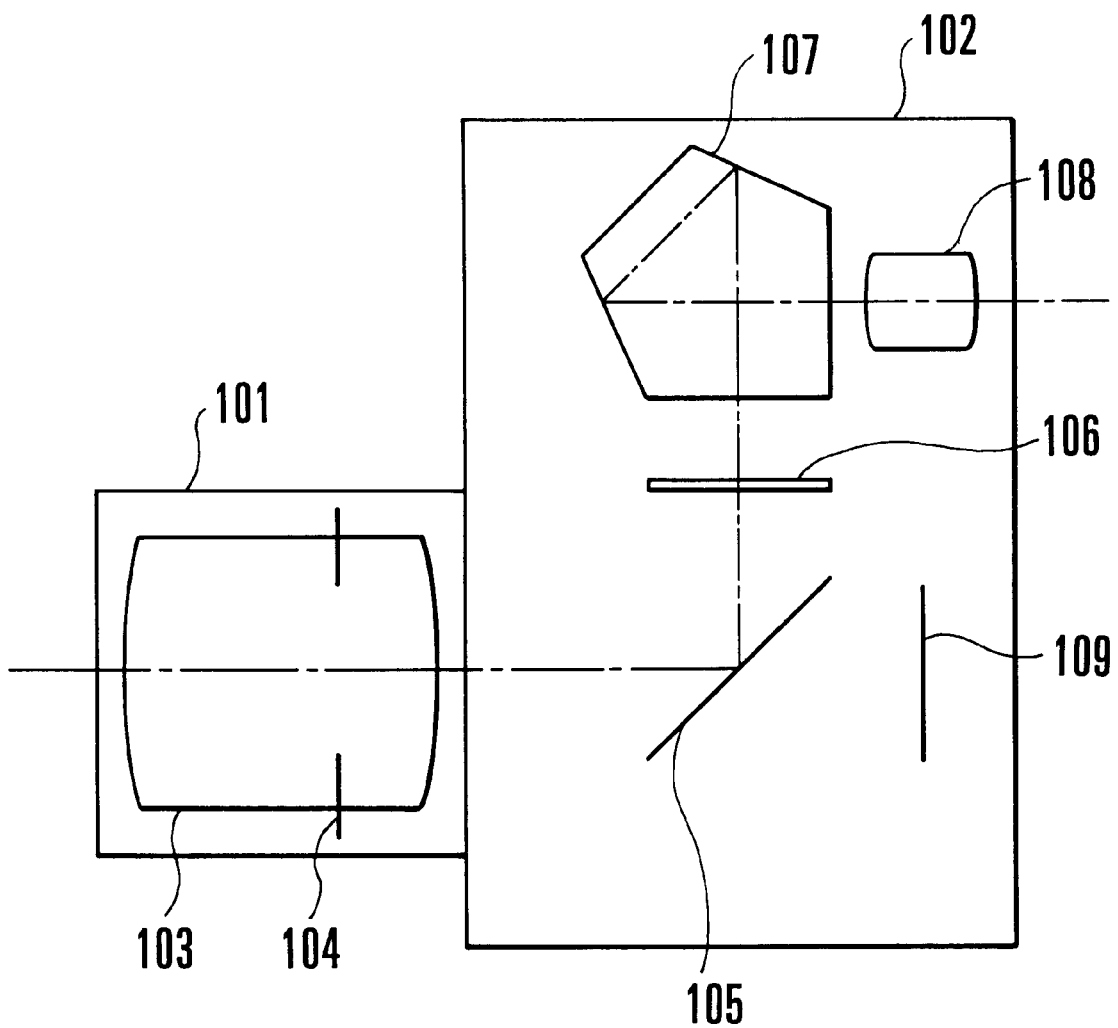
FIG. 7 is a schematic illustration showing the structure of a single-lens reflex camera.

FIG. 7 is a schematic illustration showing the structure of a single-lens reflex camera. In FIG. 7, reference numeral 101 denotes an interchangeable lens unit, and reference numeral 102 denotes a camera body. The interchangeable lens unit 101 is provided with a photographing optical system 103 containing a diaphragm device 104 working as an aperture diaphragm therein. The diaphragm device 104 corresponds to the rotation driving device according to the present invention. An object light beam incident through the photographing optical system 103 is reflected by a mirror 105 of the camera body 102 and reaches the photographer after passing through a focusing screen 106 disposed near the primary image forming plane of the photographing optical system 103, a pentagonal roof prism 107, and an eyepiece 102. When the photographer presses a shutter release switch (not shown), the mirror 105 starts to rotate and a shutter (not shown) comes into an open condition, so that an object image is formed on a film surface 109, thus achieving the photography.

In FIG. 7, although the diaphragm device according to the present invention is applied to the diaphragm device of the single-lens reflex camera, it is also appropriate to apply it to the diaphragm devices of other cameras such as a lens shutter camera. Further, the present invention is also applicable to a diaphragm device of an optical apparatus other than the camera in a range which does not depart from the scope and spirit of the present invention.

I claim:

1. A driving device comprising:
    a first fixed member having an aperture;
    a second fixed member having an aperture, said second fixed member being fixed to said first fixed member;
    a ring-like rotary member, said rotary member being supplied between said first and second fixed members and being fitted in said first fixed member in a radial direction at one portion of said rotary member and being fitted in said second fixed member in the radial direction at another portion of said rotary member having a diameter smaller than that of said one portion; and
    a moving member which is supplied between said first and second fixed members and moves in a space corresponding to the apertures of said first and second fixed members in accordance with a rotation of said rotary member, wherein X<Y is satisfied, where X is an amount of fitting play in the radial direction between said second fixed member and the another portion of said rotary member and Y is an amount of fitting play in the radial direction between said first fixed member and the one portion of said rotary member.

2. A driving device according to claim 1, wherein said rotary member and/or said second fixed member has a chamfered portion at an edge portion thereof where said rotary member is fitted in said second fixed member, and wherein, where a value obtained by adding the amount of fitting play X to a radial width of said chamfered portion is denoted by Z, said driving device satisfies the following condition:

$$X<Y<Z.$$

3. A driving device according to claim 1, wherein said rotary member has a cylindrical projecting portion, and said projecting portion is fitted in said aperture of said second fixed member.

4. A driving device according to claim 1, further comprising a stepping motor for rotating said rotary member.

5. A driving device according to claim 1, wherein said moving member includes a diaphragm blade.

6. An optical apparatus comprising:
    an optical system; and
    a diaphragm device serving as an aperture diaphragm for said optical system, said diaphragm device comprising:
    a first fixed member having an aperture;
    a second fixed member having an aperture, said second fixed member being fixed to said first fixed member;
    a ring-like rotary member, said rotary member being supplied between said first and second fixed members and being fitted in said first fixed member in a radial direction at one portion of said rotary member and being fitted in said second fixed member in the radial direction at another portion of said rotary member having a diameter smaller than that of said one portion; and
    a diaphragm blade which is supplied between said first and second fixed members and moves in a space corresponding to the apertures of said first and second fixed members in accordance with a rotation of said rotary member, wherein X<Y is satisfied, where X is an amount of fitting play in the radial direction between said second fixed member and the another portion of said rotary member and Y is an amount of fitting play in the radial direction between said first fixed member and the one portion of said rotary member.

7. An optical apparatus according to claim 6, wherein said rotary member and/or said second fixed member has a chamfered portion at an edge portion thereof where said rotary member is fitted in said second fixed member, and wherein, where a value obtained by adding the amount of fitting play X to a radial width of said chamfered portion is denoted by Z, said diaphragm device satisfies the following condition:

$$X<Y<Z.$$

8. An optical apparatus according to claim 6, wherein said rotary member has a cylindrical projecting portion, and said projecting portion is fitted in said aperture of said second fixed member.

9. An optical apparatus according to claim 6, further comprising a stepping motor for rotating said rotary member.

10. A method of manufacturing a driving device, comprising:

a first step of supplying a ring-like rotary member between a first fixed member having an aperture and a second fixed member having an aperture and fitting one portion of said rotary member in a radial direction in the first fixed member, wherein a moving member is supplied between said first and second fixed members;

a second step of fixing the second fixed member to said first fixed member, wherein another portion of said rotary member is fitted in said second fixed member in the radial direction and said another portion of said rotary member has a smaller diameter than that of the one portion of said rotary member; and a third step of moving said moving member in a space corresponding to the apertures of said first and second fixed members in accordance with a rotation of said rotary member, wherein X<Y is satisfied, where X is an amount of fitting play in the radial direction between said second fixed member and the another portion of said rotary member and Y is an amount of fitting play in the radial direction between said first fixed member and the one portion of said rotary member.

* * * * *

UNITED STATES PATENT AND TRADEMARK OFFICE
CERTIFICATE OF CORRECTION

PATENT NO. : 5,926,663
DATED : July 20, 1999
INVENTOR(S) : Ryuji Suzuki

It is certified that error appears in the above-identified patent and that said Letters Patent is hereby corrected as shown below:

Col. 3, line 61, delete "extreme exerts influence" and insert -- extreme influence --.
Col. 4, line 7, delete "portion lie" and insert -- portion 11e --.

Signed and Sealed this

Fourteenth Day of November, 2000

Attest:

Q. TODD DICKINSON

Attesting Officer

Director of Patents and Trademarks